United States Patent Office 3,232,647
Patented Feb. 1, 1966

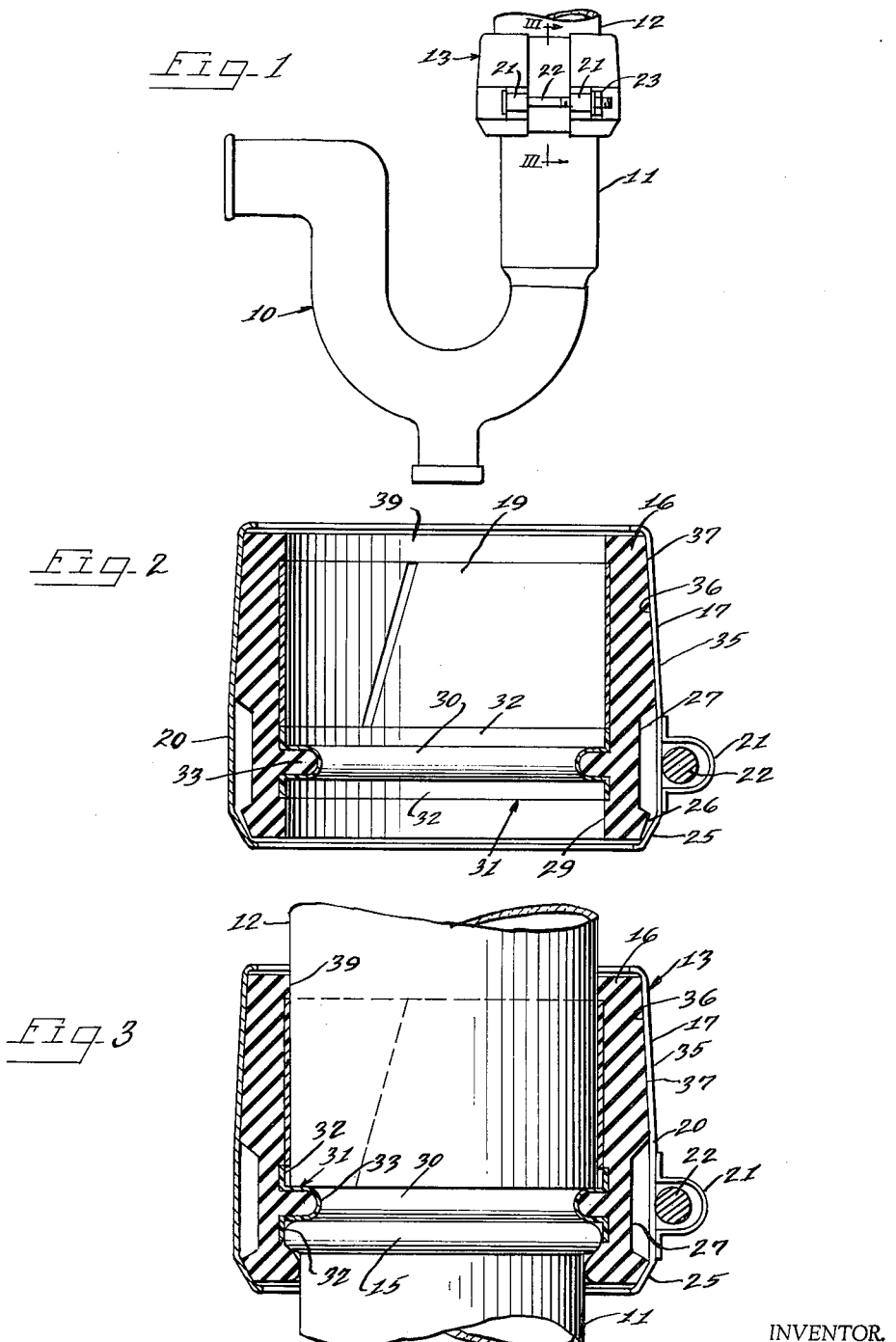

3,232,647
DRAIN LINE COUPLING FOR PLAIN END GLASS PIPE
Paul M. Kirchoff, Chicago, Ill., assignor to William J. Adams, Chicago, Ill.
Filed Dec. 6, 1961, Ser. No. 157,379
3 Claims. (Cl. 285—236)

This invention relates to improvements in pipe couplings and more particularly relates to an improved form of drainline coupling for plain end glass pipe.

A principal object of the present invention is to provide a compact simple and improved coupling for efficiently coupling a plain end glass pipe to a glass drainline.

A still further object of the invention is to provide a simple form of coupling unaffected by corrosive chemicals flowing through the pipeline, and so arranged as to more efficiently seal a glass plain end pipe to a glass drainline.

Still another object of the invention is to provide a pipe coupling for coupling the plain end of a glass pipe to the beaded inlet end of a glass drain trap, by the use of a resilient sleeve clamped into clamping engagement with the beaded end of the drainline and clamping a non-resilient contractible sleeve into sealing engagement with the end of the plain end pipe.

A still further object of the invention is to provide a coupling for more efficiently coupling a plain end pipe to the beaded end of a drainline, utilizing a resilient sleeve and the force exerted by a Morse taper, to seal and clamp the plain end pipe to the adjacent end of the drainline.

A still further and important object of the invention is to provide an improved form of coupling for glass pipes, including a resilient sleeve and a plastic spacer within the sleeve, spacing the adjacent ends of the pipes apart, and utilizing a scarfed plastic sleeve recessed within the resilient sleeve to compress the plastic sleeve into clamping engagement with the plain end pipe, and retain the plain end pipe to the plastic spacer.

These and other objects of the invention will appear from time to time as the following specification proceeds and with reference to the accompanying drawings wherein:

FIGURE 1 is a view in side elevation of a drain trap, showing a coupling constructed in accordance with the principles of the present invention clamped to the inlet end of the drain trap;

FIGURE 2 is a cross-sectional view taken through a coupling constructed in accordance with the principles of the present invention; and FIGURE 3 is a sectional view taken substantially along line III—III of FIGURE 1.

In the embodiment of the invention illustrated in the drawing, I have shown a drain trap 10 having an inlet end 11 in alignment with and connected to a plain end pipe or sink strainer 12, through a coupling 13.

The drain trap 10 and plain end pipe or sink strainer 12 may be made from Pyrex or any other form of glass. The inlet end 11 of the drain trap 10 is shown as having a bead 15 extending thereabout. The bead 15 is generally circular in cross-section and extends radially outwardly of the wall of said inlet end.

The coupling 13 is shown in FIGURES 2 and 3 as comprising a resilient sleeve 16 and a split shell 17 encircling said sleeve. The split shell 17 compresses said sleeve and a scarfed plastic sleeve 19, recessed within the inner wall of said resilient sleeve, into sealing clamping engagement with the bead 15 and inlet end 11 of the drain trap 10, and the wall of the plain end pipe 12.

The sleeve 16 may be made from rubber or from one of the well known substitutes for rubber, such as, neoprene, while the plastic sleeve 19 may be made from a non-resilient sealing material, such as Teflon or a like sealing material.

The shell 13 is shown as having an intermediate generally cylindrical wall portion 20, having generally U-shaped straps 21 secured thereto at the adjacent ends of said shell. A bolt 22 extends through said straps, and a nut 23 threaded on said bolt is provided to draw the adjacent ends of said shell together and to retain the sleeve 16 and plastic sleeve 19 into clamping engagement with the plain end pipe 12 and the beaded end of the inlet end portion 11 of the drain trap 10.

The shell 13 has a relatively short inclined wall portion 25 extending downwardly therefrom along the inlet end portion of the drain trap 11 and inclined at a relatively steep angle with respect to the cylindrical wall portion 20. The wall portion 25 engages an inverted frusto-conical wall portion 26 of the sleeve 16. The frusto-conical wall portion 26 converges from the lower margin of a recessed portion 27 of said sleeve, encircled by the cylindrical wall portion 20 of the shell 13. Drawing the ends of the shell together thus flows a lower internal cylindrical wall portion 29 of the sleeve 16 into sealing engagement with the bead 15 and presses said bead into sealing engagement with a radially inwardly extending bead 30 of a spacer 31. The spacer 31 may be made from a plastic, such as Teflon or a like material and has axially spaced flanged portions 32 recessed within the inner wall of the sleeve 16, flush with the inner wall portion 29 thereof, and terminating at their inner end portions into the radially inwardly extending spacer bead 30, shown in FIGURE 2 as being generally U-shaped in cross-section and extending about a corresponding bead 33 extending radially inwardly of the resilient sleeve 16.

The shell 17 also has a wall portion 35 extending from the opposite end of the cylindrical wall portion 20 from the wall portion 25 and inclined inwardly with respect to said cylindrical wall portion toward the axis of the sleeve 16 at a relatively flat angle, which is preferably the angle of a Morse taper.

The wall portion 35 has an inner periphery 36, extending parallel to the outer periphery thereof and engaging a tapered wall portion 37 of the resilient sleeve 16, which also tapers at the angle of a Morse taper. The resilient sleeve 16 also has a generally cylindrical upper internal wall portion 39 flush with the inner wall of the contractible plastic sleeve 19, when said plastic sleeve is in its extended condition, shown in FIGURE 2.

The inside diameter of the flange 32, the inner wall of the plastic sleeve 19 when in its extended condition, and of the resilient wall 39 are the same and are substantially the outside diameter of the plain end pipe 12, to accommodate said plain end pipe to extend within the resilient sleeve 16 into abutting engagement with the spacer bead 30.

Upon tightening of the nut 23 on the bolt 22, the adjacent ends of the scarfed plastic sleeve 19 will be drawn together into positive clamping engagement with the wall of the plain end pipe 12, and at the same time the resilient wall 39 will flow into engagement with the wall of the pipe 12 above the non-resilient plastic sleeve 19. The tightening of the non-resilient plastic sleeve against the wall of the plain end pipe and the flow and pressing of the inner cylindrical wall 39 against the wall of the plain end pipe is enhanced by virtue of the angle of taper of the wall 35 of the shell 13 and the wall 37 of the resilient sleeve 16.

It may be seen from the foregoing that a simplified coupling has been provided for coupling a plain end pipe to the adjacent end of the inlet end portion of a drain trap, which is particularly adapted to clamp glass beaded and plain end pipes in end to end relation with respect to each other, and to provide a seal between the adjacent ends of the pipes, preventing leakage at the joint between the pipes and positively retaining the adjacent ends of the pipes in communicating relation with respect to each other.

It may further be seen that the plain end pipe is gripped by the scarfed plastic sleeve and resilient wall portion 39 of the resilient sleeve and that the gripping force is attained by the taper of the wall 35 of the shell 17, cooperating with a similarly inclined wall 37 of the sleeve 16 and inclined at the angle of a Morse taper.

It may still further be seen that the coupling is in effect a slip coupling and the plain end pipe may be efficiently coupled in various positions along the coupling and in various elevations with respect to the upper end of the glass pipe.

While I have herein shown and described one form in which my invention may be embodied, it may readily be understood that various variations and modifications in the invention may be attained without departing from the spirit and scope of the novel concepts thereof as defined by the claims appended hereto.

I claim as my invention:

1. In a coupling particularly adapted to connect a plain end glass pipe to a glass drain and the like,
    (a) a resilient sleeve having
    (b) spaced upper and lower internal cylindrical wall portions,
    (c) a plastic spacer having spaced oppositely extending axial flanges recessed within said sleeve and having
    (d) a spacer bead extending radially inwardly of said oppositely extending cylindrical wall portions and adapted to be abutted by a drain pipe at one end and a plain end pipe at the opposite side thereof, to form a seal for said pipes,
    (e) a scarfed non-resilient plastic sleeve recessed within said resilient sleeve between one of said axial flanges and said upper wall portion and forming a continuation of said upper wall portion when in its extended condition,
    (f) and means compressing said resilient sleeve and drawing said scarfed contractible non-resilient sleeve into clamping engagement with the plane end pipe comprising
    (g) a split shell encircling said resilient sleeve and having
    (h) spaced oppositely facing frusto-conical wall portions converging toward the axis of said resilient sleeve as they extend along said sleeve and deforming said resilient sleeve and contracting said scarfed contractible non-resilient sleeve into sealing engagement with the plain end pipe upon the drawing of the ends of said shell toward each other, said oppositely facing frusto-conical wall portions being of different lengths and the longer of said wall portions being spaced from the outside of said contractible non-resilient sleeve by said resilient sleeve and in radial registry with said non-resilient sleeve throughout the length thereof and tapering at a relatively small angle with respect to the longitudinal axis of the plain end glass pipe.

2. A glass to glass coupling in accordance with claim 1 in which the taper of the longer of the frusto-conical wall portions of the split shell is at an angle relative to the longitudinal axis of the plain end glass pipe of substantially 3°.

3. A glass to glass coupling in accordance with claim 1 wherein the taper of the longer of the frusto-conical wall portions of the split shell is at an angle of substantially 3° relative to the longitudinal axis of the plain end glass pipe and wherein the resilient sleeve has spaced oppositely facing outer frusto-conical wall portions, conforming to the inclination of the wall portions of said split shell.

References Cited by the Examiner

UNITED STATES PATENTS

| 591,828 | 10/1897 | Duncan | 285—369 |
| 987,683 | 3/1911 | Allan | 285—369 |
| 2,114,366 | 4/1938 | Barnes | 285—423 |
| 2,567,527 | 9/1951 | Parks | 285—383 |
| 2,635,901 | 4/1953 | Osborn | 285—383 |
| 3,006,663 | 10/1961 | Bowne | 285—373 X |
| 3,084,959 | 4/1963 | Stanton | 285—233 |
| 3,104,898 | 9/1963 | MacDonald | 285—367 |

FOREIGN PATENTS

| 834,853 | 5/1960 | Great Britain. |
| 913,904 | 12/1962 | Great Britain. |

CARL W. TOMLIN, *Primary Examiner.*

THOMAS F. CALLAGHAN, *Examiner.*